United States Patent Office 3,576,882
Patented Apr. 27, 1971

3,576,882
PRODUCTION OF THIOETHERS AND ETHERS
FROM FLUORINE ARYL COMPOUNDS
Frank S. Clark, St. Louis, Mo., assignor to
Monsanto Company, St. Louis, Mo.
No Drawing. Filed Dec. 27, 1966, Ser. No. 604,556
Int. Cl. C07c 41/04, 149/30
U.S. Cl. 260—609                10 Claims

ABSTRACT OF THE DISCLOSURE

Organic ethers and thioethers are produced by the interaction of a fluorine-containing organic compound with a metal oxide or sulfide in the presence of a dipolar aprotic solvent. The organic ethers and thioethers are useful as electronic coolants, diffusion pump fluids, lubricants, damping fluids, etc.

The problems that arise following the teachings of the prior art methods are in general (a) low yields, (b) contaminated products, (c) the necessity of using activated groups to activate the halogen and (d) the lack of selectivity in obtaining preferential reaction of an iodo, bromo or chloro atom over any of the other two halogens which may be present on the same reactant or on different reactants in the same process system.

Additional problems that arise from low yields is that large quantities of starting materials have to be separated from the product which as a consequence necessitates additional and costly process steps to purify and separate the final product. These additional process steps in addition can even more drastically lower yields since part of the final product is unrecovered and discarded during product recovery steps.

As is readily apparent from the use of a catalyst in a given process, there exists the problems of (a) contaminated products and (b) side reactions. Side reactions are especially pronounced when a catalyst system is used since a catalyst can catalyze many reactions in addition to the intended reaction which is attempted to be carried out. Thus, a catalyst and the numerous number of side reaction products which are produced as a result of the employment of a catalyst have to be removed from the final product, thereby necessitating additional and difficult process steps.

The difficulty that arises with respect to the use of activating groups to activate an iodo, bromo or chloro atom is that compounds can only be prepared which contain this activating group. Thus, an entire spectrum of compounds cannot be prepared due to the fact that they do not contain an activating group. In addition, the use of an activating group provides an additional reactive site which can interact to produce additional side reactions thereby nullifying the ability to prepare a single given product in good yield.

One of the major problems that the prior art methods pose is lack of selectivity, that is, atoms such as chloro and bromo react at approximately the same rate. Thus, if a chloro and bromo atom are present in the same reactant or in different reactants in the same process system, the chloro and bromo atoms would react at approximately the same rate with, for example, a phenate ion in the presence of a copper catalyst. Where approximately the same rate of reaction exists between the chloro and bromo atoms, it becomes extremely difficult to prepare an exclusively bromo- or chloro-containing compound. In many instances, it is desirable to prepare products which contain exclusively an iodo, bromo or chloro atom or atoms. This is especially true since iodo-, bromo- and chloro-containing compounds have widely divergent physical properties such as melting point, boiling point, viscosity, flash point, fire point and density. These differing properties make certain halogen compounds especially valuable such as to impart fire resistance to blends with other compounds. As is readily apparent from the description of the above-illustrated compounds, the prior art processes do not have the required selectivity to prepare such halogen-containing compounds when, for example, a chloro and bromo atom are present on the same reactant or different reactants in the same process system, the above halogen will react.

In addition, the prior art discloses that in order to prepare a mixture of compounds wherein the mixture contains one or more chloro compounds and one or more bromo compounds and/or chloro and bromo atoms substituted on the same compound the mixture must be prepared separately by separate processes. Thus, after preparation of the individual compounds by separate processes, the compounds in turn are blended together, which blending is an additional step in the preparation of a given composition. Thus, the prior art does not disclose a method for the preparation of such mixtures of compounds wherein said mixtures are prepared in one single process. Thus, the prior art is unable to prepare in a single process the above mixtures of compounds since halogens such as bromo and chloro interact at approximately the same rate. Thus, there is no way of selectively producing the above mixtures.

It has now been found that due to the high reactivity of a fluoro atom as compared to other halogens, oxygen- and sulfur-containing compounds can be produced in good yields. In addition, due to the high reactivity of a fluoro atom, chloro- and bromo-substituted oxygen and sulfur-containing compounds and mixtures of these compounds can be produced selectively in a one-step process or a mixture of chloro- and bromo-substituted oxygen and sulfur-containing compounds can be prepared together with non-bromo- and chloro-containing oxygen and sulfur compounds in a single process. In addition, it has been found that dihydroxy compounds such as resorcinol can be interacted with fluoro-containing compounds to produce oxygen- and sulfur-containing compounds in good yields.

Thus, oxygen- and sulfur-containing compounds, halogenated derivatives thereof and mixtures of halogenated and non-halogenated derivatives thereof can be prepared by the interaction of:

(A) a fluoro-containing compound represented by the structure

wherein R is a hydrocarbon-containing group, F is a reactive fluoro atom, n is a whole number having a value of at least 1, (B) a metal compound represented by the structure

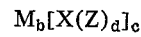

wherein M is selected from the group consisting of an alkali metal and an alkaline earth metal, X is selected from the group consistnig of oxygen, and sulfur, Z is selected from the group consisting of aryl, and a heterocyclic group, said heterocyclic group having from 3 to 10 atoms optionally interrupted by from 1 to 4 hetero atoms selected from the group consisting of oxygen, nitrogen and sulfur, b is a number having a value of at least 1, c is a number having a value of from 1 to the product of b times the valence of M provided that when M is an alkali metal c has a value of 1, d is a whole number having a value of 0 to 1, provided that when X is sulfur d has a value of 1 and when d is 0, M is an alkali metal in the presence of (C) a dipolar aprotic solvent.

In carrying out the process of this invention, the fluoro compound represented by (A), the metal compound represented by (B) and the dipolar aprotic solvent represented by (C) can be added in indifferent order, there being no criticality existing as to the order of addition of (A), (B) or (C). In order to carry out the process of this invention, a temperature, herein defined to include either a constant temperature or a variable temperature or both, is maintained for a time sufficient to effect interaction of (A) and (B) in solvent (C). The process can be carried out at atmospheric pressure, or a pressure above or below atmospheric pressure can be utilized depending on the particular reactants and the solvent utilized. In carrying out the process of this invention, the temperature is generally mainained from about 50° C. to about 350° C., although the only limitation on temperature is substantial decomposition of a reactant, solvent or product or lack of interaction of (A) and (B). The time during which the reaction is carried out can vary over a wide range and is dependent on the particular starting reactants represented by (A) and (B) and such time that is used is that time which will prepare the desired product. Many factors are weighed in determining the time and temperature conditions in carrying out the process of this invention. Thus, it may be advantageous to limit to some degree higher yields in order to increase the selectivity of interaction of (A) and (B), that is, to increase the selectivity of the interaction of a reactive fluoro atom with a compound represented by (B) when other halogens, that is, iodo, chloro and bromo, are present in (A), (B) or both.

Since the carrying out of the process involves the utilization of a solvent (C), the solvent is generally removed from the product prepared by the interaction of (A) and (B). However, in some cases, depending on, for example, the physical properties of the solvent, it may be advantageous to use the final process mixture, that is, the reaction product of (A) and (B) and the dipolar aprotic solvent (C) as a fluid composition. Thus, the solvent itself can provide some additional property in combination with the product of (A) and (B), thereby producing a fluid composition which has a particular utility such as a heat transfer fluid. In addition, the solvent can be partially or totally removed depending on the purity of the product desired and the final intended use for the product. Thus, for example, when a phosphoroamidate such as N-methyl-N-butyl - N' - methyl - N' - butyl-N''-methyl-N''-butylphosphorotriamidate is used as a dipolar aprotic solvent, such phosphoroamidate itself may be a blending agent for the compound produced by reacting (A) and (B) such as when a 3- to 5-ring polyphenyl ether is produced by the process of this invention and such blend of dipolar aprotic solvent and product can have utility, for example, as a hydraulic fluid or heat transfer fluid.

With respect to metal compound (B), which is utilized in the process of this invention, such metal compound can be added to the process system or in the alternative can be prepared in situ in the process system. Thus, for example, metal compound (B) can be prepared in the aprotic solvent (C) by mixing, for example, a metal hydroxide with a phenol compound to produce a metal phenate.

Typical examples of M are lithium, sodium, potassium, rubidium, magnesium, calcium and barium.

The reactive fluoro-containing compound represented by (A) is defined as a compound which contains at least one reactive fluoro atom. The term "reactive fluoro atom" is used to designate that fluoro atom which enters into the reaction in carrying out the process of this invention. Thus, less than the total number of fluoro atoms which are present in a given molecule can interact with (B) to produce a given product. R includes hydrocarbon-containing groups which contain, in addition to hydrogen and carbon, elements such as halogen, halogen herein defined to include iodine, bromine and chloride as well as fluorine when fluorine does not participate in the reaction with (B). The reactive fluoro atom or atoms have been found to be highly reactive when interacted with compound (B) in the presence of (C). Thus, a high degree of reactivity, and therefore, selectivity, provides a process whereby iodo, bromo, and chloro compounds can be prepared in a one-step process. In addition, the high degree of reactivity of the reactive fluoro atom provides a process whereby a mixture containing a halogenated compound and a non-halogenated compound can be prepared by utilizing one process. Thus, for example, a 3-, 4- or 5-ring unsubstituted polyphenyl ether can be prepared at the same time as a compound such as m-bis(m-bromophenoxy)-benzene. Thus, it is only necessary to utilize at least two different reactants which are represented by (A) to prepare a mixture of compounds which mixture would have physical properties different than the individual compounds that comprise the mixture.

The hydrocarbon-containing groups represented by R can be aryl, aryl herein defined to include mono-, di- and polynuclear aromatic hydrocarbon such as phenyl, naphthyl and anthryl; alkyl, alkenyl, cycloalkyl and a carbon-containing heterocyclic ring containing from 3 to 10 carbon atoms optionally interrupted by from 1 to 4 hetero atoms selected from oxygen and sulfur.

The terms "aryl," "alkyl," "cycloalkyl," and "heterocyclic group" are defined herein to include those groups which are unsubstituted as well as substituted. Typical examples of substituents which can be attached to the aforedescribed groups are halogen, aryloxy, aryl, alkaryl, aralkyl, alkoxy, polyaryloxy, haloaryl, arylmercapto, polyarylmercapto, haloarylmercapto, hydroxyl, haloalkyl, haloaryloxy and the like. Thus, other elements can be present other than carbon and hydrogen as for example oxygen, nitrogen, sulfur and halogen, which elements in turn can form all or part of a group which can be substituted upon the hydrocarbon or can link two or more hydrocarbon groups. Generally, the hydrocarbon-containing group will contain up to about 15 elements per reactive fluoro atom and still more generally up to about 10 elements per reactive fluoro atom.

The process of this invention is particularly applicable to a process whereby the hydrocarbon-containing group of starting reactant (A) contains as an upper limit of the number of carbon atoms per reactive fluoro atom of up to about 48 carbon atoms and even more applicable when the hydrocarbon-containing group contains up to about 30 carbon atoms per reactive fluoro atom.

Whereas the process in general is most applicable to reactants represented by (A) wherein the hydrocarbon-containing group is as aforedescribed, the process of this invention includes processes whereby the starting reactant (A) contains a number of carbon atoms and elements which are in excess of those described above.

Thus, depending on the product which is sought to be obtained, a compound represented by (A) can contain a number of carbon atoms and elements in considerable excess of the above limit. As an example of a reactant represented by (A) containing a considerable number of carbon atoms in excess of the preferred upper limit is the polymer obtained by the polymerization of, for example, m-difluorobenzene with potassium resorcinate. Thus, a polymer can be produced which has one or more terminal fluoro atoms which polymer has a number of carbon atoms in considerable excess of the preferred upper limit. This polymer in turn can be further interacted to prepare an even higher molecular weight compound. The process of this invention contemplates that materials having a number of carbon atoms in excess of the preferred upper limit can be interacted with a compound represented by (B) and such interaction in the presence of (C) is included within the process of this invention.

Typical examples of R when R is aryl are phenyl, mono- and polychlorophenyl, mono- and polybromophenyl, xylyl, xylylene, mesityl, ethylphenyl, ethylphenylene, n-propylphenyl, n-butylphenyl, tert-butylphenylene, amylphenyl, diisopropylphenyl, caprylphenylene, octylphenyl, nonylphenyl, decylphenyl, laurylphenyl, laurylphenylene, tridecylphenyl, hexadecylphenyl, stearylphenyl, wax phenyl, methylphenylene, hydroxyphenylene, hydroxyphenyl, methylhydroxyphenyl, methylhydroxyphenylene, butoxyphenyl, lauroxyphenyl, lauroxyphenylene, methylmethoxyphenyl, ethylmethoxyphenyl, ethylchlorophenyl, isopropylchlorophenylene, phenylmercaptophenyl, phenoxyphenyl, phenanthryl, anthryl, methylisopropylphenanthryl, chloronaphthyl, benzohydryl, biphenylyl and biphenylene.

Typical examples of aromatic compounds represented by (A) which are useful in the process of this invention are aromatic halides, such as mono- and difluoronaphthalenes, mono- and difluorobenzophenones, fluorobenzyl halides, halobenzyl fluorides, fluorobenzothioxoles, fluorobenzothiazoles, fluorobenzene, o-, m- and p-difluorobenzene, 1-chloro-2-fluorobenzene, 1-chloro-3-fluorobenzene, 1-chloro-4-fluorobenzene, 1 - bromo - 3 - fluorobenzene, 1-bromo-2-fluorobenzene, 1-bromo-4-fluorobenzene, 1-iodo-3-fluorobenzene, 1-chloro-3,5-difluorobenzene, 1-chloro-2,5-difluorobenzene, 1,3,5-trifluorobenzene, 1-bromo-3,5-difluorobenzene, 1-bromo-2,3-difluorobenzene, 1-iodo-2,4-difluorobenzene, 1-iodo-3,5-difluorobenzene, and the like; sulfides such as 1-fluoro-4-phenylmercaptobenzene, 1-fluoro-3-phenylmercaptobenzene, 1-fluoro-4-phenylmercaptobenzene, 1-chloro-2-phenylmercapto-4-fluorobenzene, 1-bromo-2-phenylmercapto-4-fluorobenzene, 1-iodo-2-phenylmercapto-4-fluorobenzene, 1 - chloro-2-fluoro-3-phenylmercapto benzene, 1 - bromo-2-fluoro-3-phenylmercaptobenzene, 1,3,5-trichloro-2-(3,5-dichlorophenylmercapto)-4-fluorobenzene, 2,4 - dibromo-3-(2,4-dibromophenylmercapto)-1-fluorobenzene, 1 - fluoro-2-phenylmercapto-3-fluorobenzene, 3-phenylmercapto - 3' - (m-fluorophenylmercapto)diphenyl sulfide, 1-fluoro - 2 - (3-bromophenylmercapto) - 4 - bromobenzene, 1 - fluoro-2-(3-iodophenylmercapto) - 4 - iodobenzene, 1 - phenylmercapto-3-(m-fluorophenylmercapto)-benzene; ethers such as 4-fluorodiphenyl ether, 2-fluorodiphenyl ether, 3-fluorodiphenyl ether, 3-(p-fluorophenoxy)-diphenyl ether, 3-(o-fluorophenoxy)diphenyl ether, 3-(m-fluorophenoxy)diphenyl ether, 3-phenoxy-3'-(m-fluorophenoxy)diphenyl ether, 3-chloro-3'-(p-fluorophenoxy)diphenyl ether, 4 - (o - fluorophenoxy)diphenyl ether, 1-chloro - 2 - phenoxyphenoxy-4-fluorobenzene, 1-bromo-3-phenoxyphenyl-2-fluorobenzene, 1-iodo-2-phenoxyphenyl-3-fluorobenzene, 1 - chloro-2-fluoro-3-phenoxyphenylbenzene, 1 - bromo-2-fluoro-4-phenoxyphenyl-benzene, 1,3,5-trichloro-2-(3,5-dichlorophenoxyphenyl)-4-fluorobenzene, 2,4 - dibromo-3-(2,4-dibromophenoxyphenyl)-1-fluorobenzene, 1-fluoro - 2 - phenoxyphenyl-3-fluorobenzene, 1-bromo - 2 - (3-bromophenoxyphenyl)-4-fluorobenzene and 1 - iodo-2-(3-iodophenoxyphenyl)-4-fluorobenzene.

Typical examples of halothiophenes which can be utilized in the process of this invention are 2-chloro-4-fluorothiophene, 3-bromo-4-fluorothiophene, 2,3,4,5-tetrafluorothiophene, 3,4,5-trifluorothiophene, 2,5-difluorothiophene, 2,3,4-tribromo - 5 - fluorothiophene, 2-iodo-5-fluorothiophene, 3,4-difluorothiophene, and 2,3,4-trichloro-5-fluorothiophene.

Additional examples of hydrocarbon-containing groups represented by R are alkyl such as methyl, ethyl, propyl, butyl, amyl, hexyl, heptyl, octyl, nonyl, ocetadecyl; cycloaliphatic, such as cyclopropyl, cyclobutyl, cyclohexyl, mono- and polymethyl cyclohexyl, mono- and polyisopropyl cyclohexyl and the like; oxy-containing aliphatic, cycloaliphatic and aromatic radicals, such as alkoxy-substituted alkyl radicals, cycloalkoxy-substituted alkyl radicals, aroxy-substituted alkyl radicals, aroxy-substituted cyclohexyl, carboalkoxycycloalkyl radicals and the like.

The metal compounds represented by (B) include both inorganic compounds and compounds wherein Z is aryl or a heterocyclic group. The inorganic compounds are limited to alkali metal derivatives of oxygen, typical examples of which are sodium oxide, lithium oxide, potassium oxide. The metal compounds represented by (B) when $c$ has a value of 1 have as a linking atom between the group represented by Z and the metal M, oxygen, and sulfur. It is preferred to utilize in the process of this invention a metal represented by M which is an alkali metal. It has been found in general that the yields obtainable utilizing an alkali metal represented by M are higher than the corresponding alkaline earth metals. However, the alkaline earth metals represented by M are effective in carrying out the process of this invention and are contemplated within the scope of this invention.

The hydrocarbon portion of the reactant represented by (B), that is, Z, can be aryl or a heterocyclic group, aryl and a heterocyclic group herein defined to include those groups which are unsubstituted as well as substituted. Typical examples of aryl groups are those illustrated above, that is, aryl groups which are represented by R. Thus, the examples of the above aryl groups are equally applicable to those aryl groups as represented by Z. In addition to the above-illustrated aryl groups, such as phenyl, naphthyl and anthryl and the corresponding alkyl derivatives thereof, additional examples of aryl compounds are halogenated phenyl, o-, m- and p-trifluoromethylphenyl, o-, m- and p-2,2,2-trifluoroethylphenyl, o-, m- and p-3,3,3-trifluoropropylphenyl, o-, m- and p-4,4,4-trifluorobutylphenyl, alkylhydroxyphenyl, alkylchlorophenyl, alkylcyanophenyl, butylcyano naphthyl, cyclohexylphenyl, phenoxyphenyl, tert-butyl phenoxyphenyl, aminophenyl, o-, m- and p-phenoxyphenyl and the like.

Typical examples of heterocyclic groups are furyl, thienyl, piperidyl, pyrryl, thiazolyl, thiadiazolyl, pyrazinyl, pyridyl, pyrazolyl, imidazolyl, oxazolyl, pyrimidinyl or a benz derivative thereof such as benzisoxazolyl, benzimidazolyl, benzofuranyl, benzothiazolyl, benzotriazolyl, benzoxazolyl, benzothienyl, indazolyl or isoindazolyl.

Typical examples of metal compounds represented by (B) are metal phenate, metal resorcinate, metal fluorophenate, metal o-, m- and p-phenoxyphenate, metal o-, m, and p-(m-fluorophenoxy)phenate and metal m-(m-phenoxyphenoxy)phenate.

Typical examples of unsubstituted and substituted aroxy-, and oxyheterocyclic groups from which the metal compounds represented by (B) can be derived are phenol, o-, m- and p-cresol, cyanophenol, guaiacol, saligenin, thymol, o-, m- and p-hydroxy acetophenone, o-, m- and p-hydroxydiphenyl, o-, m- and p-cyclohexyl phenol, catechol, resorcinol, pyrogallol, o-, m- and p-aminophenol, α- and β-naphthol, 8-octyl-β-naphthol, 6-dodecyl-α-naphthol, 3,4-dimethyl-5-hexyl phenol, n-decyl phenol, acetophenol, nonyl phenol, alkaryl-substituted phenol, alkyl resorcinol, octyl catechol, thiophene-3-ol, 2,3'-quinoxaline diol, triisobutyl pyrogallol, 2-pyridinol, 2,6-di-sec-butyl-p-amino phenol, 4-N,N-dibutylaminomethyl-2,6-di-sec-butyl phenol, o-, m- and p-phenoxyphenols, o-, m- and p-[(o-, m- and p-phenoxyphenols)] phenols hydroxy quinoline, such an 2-hydroxy quinoline, 3-hydroxy quinoline, 6-hydroxy quinoline, 7-hydroxy quinoline, 8-hydroxy quinoline, and hydroquinoline and the corresponding thio derivatives, that is, when OH is replaced with SH.

The dipolar aprotic solvent represented by (C) is herein defined as a solvent that does not readily accept or donate a proton when being utilized as a solvent in the process of this invention under the particular process conditions which are utilized in carrying out the process of this invention. Thus, for example, time, temperature, pressure and mole ratio of reactants can be adjusted to limit the accepting or donating of a proton by the solvent molecule. In addition, the dipolar aprotic solvent can contain substituents attached thereto in an amount such that the substituents do not completely nullify the effectiveness of the dipolar aprotic solvent. Typical examples of dipolar aprotic solvents represented by (C) are those solvents which are characterized by the presence therein of at least one group selected from the group consisting of

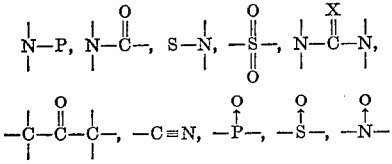

and mixtures thereof wherein P is a phosphorus-containing residue, S is a sulfur-containing residue, provided that there is at least one phosphorus and one sulfur atom attached to the nitrogen atom, and X is an element selected from the group consisting of oxygen and sulfur, provided that there cannot be present more than one hydrogen atom attached to each nitrogen atom.

It is within the scope of this invention that more than one compound which is characterized by the presence of the above dipolar groups can be blended together to form a dipolar aprotic solvent. In addition, a compound can contain more than one of the above dipolar groups within the same compound and such compounds are included within the term dipolar aprotic solvent. Typical examples of a solvent characterized by the presence of at least one

group are amides, such as tertiary and secondary amides, examples of which are dimethylformamide, dimethylacetamide, diethylacetamide, dimethylpropionamide, dimethylbutyramide, diisopropylacetamide, dimethylcapro-amide, dimethyllauramide, dimethylpalmitide, dimethylstearamide, dicyclohexylformamide, dicyclohexylacetamide, methylethylformamide, methyloctadecylacetamide and the like; cyclic amides such as caprolactam, N-methyl-4-methyl-2-pyrrolidone, N-methyl-3,4-diethylpyrrolidone, N-methyl-2-pyrrolidone, N-ethyl-2-pyrrolidone, N-propyl-2-pyrrolidone, N-octyl-2-pyrrolidone, N-octadecyl-2-pyrrolidone, N-methyl-2-piperidone, N-methylphthalimidine pyrrolidone methylacetamide, ethylformamide, cyclohexylacetamide, cyclohexylformamide, methylstearamide, methylpalmitamide, methyllauramide, methylcaproamide, isopropylacetamide, N-methylbutyramide, methylpropionamide, ethylidene-bis-3-(2-pyrrolidone) and the like.

Typical examples of dipolar aprotic solvents which are characterized by the presence of at least one >N—P group within the solvent are amides of an acid of phosphorus, which amides can be derived from phosphorus acids such as phosphonic and phosphinic acids, phosphoric acid, phosphorus acid and phosphonous acids. Typical examples of amides of an acid of phosphorus are P,P-dimethyl-N,N-dimethylphosphinic amide, pentamethylphosphonic diamide, P-ethyl-N,N,N',N'-tetramethylphosphonic diamide, N,N'-tetramethyl-P-phenylphosphonous amide, P-butyl-N,N,N',N' - tetramethylphosphonic amide, tetramethylphosphorus diamide, P - methyl - N,N,N',N'-tetraethylphosphonic amide, P,P - diethyl - N,N - dimethylphosphinic amide, N,N' - tetramethyl - P - ethylphosphonous amide, phenylmethyl - N,N - dimethylphosphoroamidate, phenylmethyl - N,N - di - n - butylphosphoroamidate; mixtures of phenyl - m - cresyl - N,N - dimethylphosphoroamidate and phenyl - p - cresyl - N,N-dimethylphosphoroamidate; mixtures of m - cresyl - p-cresyl - N,N - dimethylphosphoroamidate, di - m - cresyl-N,N-dimethylphosphoroamidate and di-p-cresyl-N,N-dimethylphosphoroamidate; di-m-bromophenyl-N-methyl-N-n-butylphosphoroamidate, phenyl - N,N - di - n - butyl-N',N'-di-n-butylphosphorodiamidate, phenyl - N,N - di-methyl-N',N'-dimethylphosphorodiamidate, m - bromophenyl-N-methyl-N-n-butyl-N' - methyl - N' - n - butylphosphorodiamidate, p - bromophenyl - N - methyl - N-isobutyl - N' - methyl - N' - isoamylphosphorodiamidate, N - methyl - N - butyl - N' - methyl - N' - butyl - N''-methyl - N'' - butylphosphorotriamidate, N - methyl - N - butyl - N',N'' - tetramethylphosphorotriamidate, N - di-n - propyl - N',N'' - tetramethylphosphorotriamidate, N, N' - tetra - n - propyl - N'' - dimethylphosphorotriamidate, and N,N',N''-hexamethylphosphorotriamidate.

Typical examples of dipolar aprotic solvents characterized by the presence within the structure of >N—S are amides of sulfur acids which amides can be derived from sulfur acids, such as sulfonic acid, sulfinic acid, sulfuric acid and sulfurous acid. Typical examples of such amides are tetramethylsulfamide, tetramethylsulfurous amide, N,N-diethylbenzenesulfonamide, N,N-dibutylbenzenesulfinic amide, tetraethylsulfamide, tetraethylsulfurous amide, N,N-dimethylbenzenesulfonamide and N,N-dimethylbenzenesulfinic amide.

Another group of dipolar aprotic solvents are characterized by the presence of

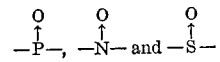

within the solvent molecule. Typical examples of the oxides of nitrogen, phosphorus and sulfur are pyridene N-oxide, phosphine oxides, such as triethyl phosphine oxide, triphenyl phosphine oxide; sulfur oxides, that is, sulfoxides, such as dimethyl sulfoxide, diethyl sulfoxide, diphenyl sulfoxide, ethylmethyl sulfoxide, o-(phenylsulfinyl)-N,N-dimethyl aniline.

Typical examples of dipolar aprotic solvents which are characterized by C≡N within the solvent molecule are nitriles, such as hexane nitrile, dodecane, dinitrile, 2-nonyl-decane dinitrile, acetonitrile, butyl cyanide, benzyl cyanide, 2-naphthyl cyanide, nicotino nitrile, succinonitrile, isophthalo nitrile, 5-pyrimidene carbo nitrile, 1,4-cyclohexane dicarbo nitrile, N,N-dimethyl-2-amino propionitrile, 4-morpholine acetonitrile, 4-pyridene propionitrile and 2-cyano-N,N-dimethyl acetamide.

Additional dipolar aprotic solvents which are characterized by

are sulfones, such as diethyl sulfone, diphenyl sulfone, hexylphenyl sulfone, 1-naphthylphenyl sulfone and tetrahydro-1,1-dioxy thiophene.

Typical examples of dipolar aprotic solvents which are characterized by the presence of

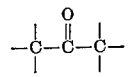

are ketones, examples of which are acetophenone, propiophenone, butyrophenone, pelargonophenone, capriphenone, hendecanophenone, acetonaphthone, capronaphthone, rachiodophenone, stearonaphthone, benzoin, methyl-2-naphthyl ketone, benzophenone, 4,4'-bis(dimethylamine)benzophenone, 4-methyl benzophenone, 4,4'-dimethyl benzophenone, 2-, 3- and 4-dimethylamino benzophenone, 4,4'-dicyano benzophenone, 1-naphthyl ketone, 4-methyl-1-naphthyl 1-naphthyl ketone, 4-methoxy-1-naphthyl 1-naphthyl ketone, 4-dimethylamine-1-naphthyl 1-naphthyl ketone, 1-naphthyl phenyl ketone, furfuryl ketone, methyl furfuryl ketone, phenyl furfuryl ketone, 1-naphthyl furfuryl ketone.

In addition, the process of this invention can be carried out in the presence of the dipolar aprotic solvent represented by (C) and an additional solvent which is not classified within the scope of reactant (C). Thus, it is within the scope of this invention that other solvents such as aromatic or aliphatic solvents can be utilized together with a solvent represented by (C) in a concentration such that it does not completely nullify the effectiveness of the dipolar aprotic solvent.

Utilizing the process of this invention, oxygen-, sulfur- and nitrogen-containing compounds can be prepared. Typical examples of compounds which can be prepared are polyphenyl ethers, polyphenyl thioethers, mixed polyphenyl ether-thioethers, phenoxybiphenyls, phenylmercaptobiphenyls and mixed phenoxyphenylmercaptobiphenyls. Such compounds and mixtures of compounds have been found to have many applications especially as functional fluids. Functional fluids have been used as electronic coolants, atomic reactor coolants, diffusion pump fluids, lubricants, damping fluids, bases for greases, power transmission and hydraulic fluids, heat transfer fluids, heat pump fluids, refrigeration equipment fluids and as filter mediums for air conditioning systems. Because of the wide variety of applications and the varied conditions under which functional fluids are utilized, the properties desired in a good functional fluid necessarily vary with the particular application in which it is to be utilized with each individual application requiring a functional fluid having a specific class of properties. Of the foregoing, the use of functional fluids as hydraulic fluids, particularly aircraft hydraulic fluids, jet engine lubricants and heat transfer fluids, has posed what is probably the most difficult area of application. Thus, a functional fluid must be as highly non-flammable as possible and must be sufficiently non-flammable to satisfy aircraft requirements for fire resistance.

A few examples of compounds and mixtures of compounds which can be prepared utilizing the process of this invention are represented by the following structure

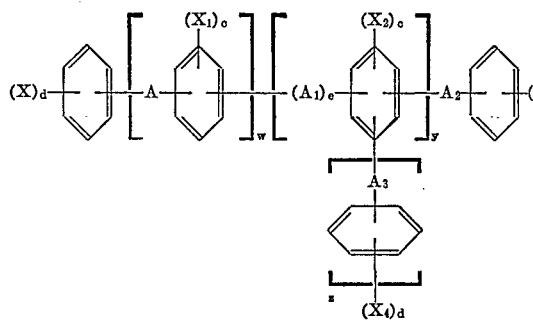

wherein $A$, $A_1$, $A_2$ and $A_3$ are each a chalkogen having an atomic number of 8 to 16, $X$, $X_1$, $X_2$, $X_3$ and $X_4$ each are selected from the group consisting of hydrogen, alkyl, haloalkyl, halogen, phenyl, alkaryl, hydroxyl, alkoxy, aralkyl and substituted aralkyl; $w$, $y$ and $z$ are whole numbers each having a value of 0 to 8; $c$ is a whole number having a value of from 1 to 4; $d$ is a whole number having a value of from 1 to 5 and $e$ is a whole number having a value of 0 to 1 provided that when $e$ is 0, $y$ can have a value of 1 to 2. Typical examples of such base stocks are 2- to 7-ring o-, m- and p-polyphenyl ethers and mixtures thereof, polyphenyl thioethers and mixtures thereof, mixed polyphenyl ether-thioether compounds in which at least one of the chalkogens represented by $A$, $A_1$, $A_2$ and $A_3$ is dissimilar with respect to any one of the other chalkogens, phenoxybiphenyls, phenylmercaptobiphenyls, mixed phenoxyphenylmercaptobiphenyls and mixtures thereof.

Typical examples of substituted polyphenyl ethers are the bis(phenoxyphenyl) ethers, e.g., bis(m-phenoxyphenyl) ether; the bis(phenoxyphenoxy)benzenes, e.g., m-bis-(m-phenoxyphenoxy)benzene, m-bis(p-phenoxyphenoxy) benzene, o-bis(o-phenoxyphenoxy)benzene; the bis(phenoxyphenoxyphenyl) ethers, e.g., bis[m-(m-phenoxyphenoxy)phenyl] ether, bis[p-(p-phenoxyphenoxy)phenyl] ether, m-[(m-phenoxyphenoxy)(o-phenoxyphenoxy)] ether and the bis(phenoxyphenoxyphenoxy)benzenes, e.g., m-bis[m-(m-phenoxyphenoxy)phenoxy]benzene, p-bis[p-(m-phenoxyphenoxy)phenoxy]benzene, m-bis[m-phenoxyphenoxy)phenoxy]benzene and 1,3,4-triphenoxybenzene.

Examples of substituted polyphenyl ethers are 1-(p-methylphenoxy) - 4 - phenoxybenzene, 2,4-diphenoxy-1-methylbenzene, bis[p-(p-methylphenoxy)phenyl] ether, bis[p-(p-tert-butylphenoxy)phenyl] ether and mixtures thereof.

Typical examples of phenoxybiphenyl compounds, that is, when $e$ has a value of 0 and and $A$, $A_1$, $A_2$ and $A_3$ are oxygen are 3,3'-diphenoxybiphenyl, 3,2'-diphenoxybiphenyl, 3,4'-diphenoxybiphenyl, 3,4-diphenoxybiphenyl, o-, m- and p-phenoxybiphenyl and tri- and tetra-substituted phenoxy biphenyls.

Typical examples of polyphenyl thioethers, that is when $A$, $A_1$, $A_2$ and $A_3$ are sulfur and $e$ has a value of 1 are o-bis(phenylmercapto)benzene,
m-bis(phenylmercapto)benzene,
bis(m-phenylmercaptophenyl) sulfide,
m-phenylmercaptophenyl-p-phenylmercaptophenyl sulfide,
the tris(phenylmercapto)benzenes, such as 1,2,4-tris(phenylmercapto)benzene,
m-bis(m-phenylmercaptophenylmercapto)benzene,
bis[m-(m-phenylmercaptophenylmercapto)phenyl] sulfide,
m-(m-chlorophenylmercapto)-m-phenylmercaptobenzene,
m-chlorodiphenyl sulfide,
bis o-phenylmercaptophenyl) sulfide,
1,2,3-tris(phenylmercapto)benzene,
o-bis(o-phenylmercaptophenylmercapto)benzene,
m-bis(p-phenylmercaptophenylmercapto)benzene and mixtures thereof.

Typical examples of phenylmercaptobiphenyls, that is, where $e$ has a value of 0 and $A$, $A_1$, $A_2$ and $A_3$ are sulfur are 3,3'-bis(phenylmercapto)biphenyl,
o-, m- and p-phenylmercaptobiphenyl,
3,4-phenylmercaptobiphenyl,
2,3-bis(phenylmercapto)biphenyl,
3-(m-chlorophenylmercapto)-3'-phenylmercaptobiphenyl and mixtures thereof.

Typical examples of mixed polyphenyl ether-thioethers, that is, where $e$ has a value of 1 and at least one of the chalkogens represented by $A$, $A_1$, $A_2$ and $A_3$ is dissimilar with respect to any other chalkogen are 1-phenylmercapto-2,3-bis(phenoxy)benzene,
2-phenylmercapto-4'-phenoxydiphenyl sulfide,
2-phenoxy-3'-phenylmercaptodiphenyl sulfide,
2,2'-bis(phenylmercapto)diphenyl ether,
3,4'-bis(m-tolylmercapto)diphenyl ether,
3,3'-bis(xylylmercapto)diphenyl ether,
3,4'-bis(m-isopropylphenylmercapto)diphenyl ether,
3,4'-bis(p-tert-butylphenylmercapto)diphenyl ether,
3,3'-bis(m-chlorophenylmercapto)diphenyl ether,
3,3'-bis(m-trifluoromethylphenylmercapto)diphenyl ether,
3,4'-bis(m-perfluorobutylphenylmercapto)diphenyl ether, 2-(m-tolyloxy(-2'-phenylmercaptodiphenyl sulfide,
m-phenylmercaptodiphenyl ether,
3,3'-bis(phenylmercapto)diphenyl ether,
3,3'-bis(phenoxy)diphenyl sulfide,
3-phenoxy-3'-phenylmercaptodiphenyl sulfide,
3-phenylmercapto-3'-phenoxydiphenyl ether,
3,4'-bis(phenylmercapto)diphenyl ether,
m-bis(m-phenylmercaptophenoxy)benzene,
3-phenylmercapto-3'-(m-phenylmercaptophenyl-
  mercapto)diphenyl ether and mixtures thereof.

Typical examples of mixed phenoxy-thiophenoxy diphenyl, that is, where e has a value of 0 and one of the chalkogens represented by A, $A_1$, $A_2$ and $A_3$ is dissimilar with respect to any other chalkogen are phenylmercaptophenoxybiphenyl, phenylmercaptophenyl, phenoxyphenoxybiphenyl and mixtures thereof.

This invention can be better understood by the following non-limiting examples.

EXAMPLE 1

To a round bottom flask equipped with reflux condenser was charged 16.5 grams (0.125 mole) of potassium phenate and 40 ml. of N-methylpyrrolidone. The reaction system was purged with nitrogen and 5.7 grams (0.05 mole) of m-difluorobenzene was added at about 95° C. The temperature was increased to 211° C. and maintained for a period of about 5 hours. The reaction system was then allowed to reach room temperature and 40 ml. of water was added. The reaction product was extracted with 30 ml. of benzene and after removal of the benzene solvent the analysis indicated an 89% yield of bis(m-phenoxy)benzene.

EXAMPLE 2

To a round bottom flask equipped with a reflux condenser was charged under nitrogen 28.2 grams (0.3 mole) of phenol, 19.3 grams (0.3 mole) potassium hydroxide and 110 ml. of N-methylpyrrolidone. The temperature was increased to 210° C. and approximately 10½ ml. of N-methylpyrrolidone and water were stripped from the reaction in order to remove water. The temperature was reduced to about 78° C. and m-difluorobenzene (0.3 mole) was added to the reaction flask. The temperature was increased to 185° C. over a period of 7 hours and during this time an additional 20 ml. of N-methylpyrrolidone was charged to the reaction system. The temperature was reduced to room temperature and 150 ml. of water was added. The reaction product was extracted with ether and upon analysis gave 60% of 3-fluorodiphenyl ether and 9% bis(m-phenoxy)benzene.

EXAMPLE 3

To a suitable reaction flask was charged 60 ml. of N-methylpyrrolidone, 100 ml. (0.05 mole) of methanolic potassium resorcinate. After removal of the methanol, 18.8 grams (0.098 mole) of m-fluorodiphenyl ether was added to the reaction flask together with 20 ml. of N-methylpyrrolidone. The temperature was increased to 205° C. and the reaction was continued for a period of 20 hours. The reaction was cooled and 100 ml. of water was added. The reaction product was extracted with 40 ml. of benzene and the product after analysis showed a 77.4% conversion to bis-m-(m-phenoxyphenoxy)benzene.

The following table, Table I, illustrates additional examples of the process of this invention. The temperatures that were utilized in the following examples were generally from about 150° to about 240°. The procedure that was utilized in the foregoing examples as to the extraction of the reaction products and the removal of solvents was similar to the procedure utilized in the previous examples. In addition, the reaction products were identified using gas liquid chromatography followed by infrared analysis.

TABLE I

| Experiment Number | A R(F)$_n$ reactant | B M$_b$[X(Z)]$_d$]$_c$ reactant | Mole ratio, A:B | Character-izing group | Dipolar Aprotic Solvent Solvent | Time, hours | Compound | Yield, percent |
|---|---|---|---|---|---|---|---|---|
| 4 | 3-fluoroaniline | Potassium phenate | 1:1 | O=C−N | Dibutylacetamide | 42 | 3-amino diphenyl ether | 5 |
| 5 | m-Difluorobenzene | Potassium resorcinate | 1:1 | O=C−N | N-methyl pyrrolidone | 17 | Polyphenyl ether (average MW about 730) | 80 |
| 6 | do | Sodium thiophenate | 1:1 | O=C−N | do | 1/4 | bis(m-phenylmercapto)benzene | 79 |
| 7 | Sodium-p-fluoro thiophenate | Sodium-p-fluoro thiophenate | 1:2 | O=C−N | do | 6 | Polyphenyl thioether polymer | 90 |
| 8 | 4,4'-difluoro biphenyl | Potassium phenate | | O=C−N | do | 8 | (A) 4,4'-diphenoxybiphenyl / (B) 4-phenoxy-4'-fluorobiphenyl | 74 / 23 |

TABLE I—Continued

| Experiment Number | A R(F)ₙ reactant | B Mₒ[X(Z)]ₑ reactant | Mole ratio A:B | Character-izing group | Dipolar Aprotic Solvent | Time, hours | Compound | Yield, percent |
|---|---|---|---|---|---|---|---|---|
| 9 | m-Difluorobenzene | Potassium-2-carboxy thiophenate | 1:2 | O=C-O⁻ (−CN) | ...do... | 30 | bis-m-(O-carboxyphenylmercapto)-benzene | ... |
| 10 | Hexyl fluoride | Potassium phenate | 1:1 | O=C (−CN) | ...do... | 30 | Hexyl phenyl ether | 79 |
| 11 | 3-fluoro diphenyl ether | Sodium oxide | 2:1 | O=C (−CN) | ...do... | 5 | m-bis(m-phenoxy)diphenyl ether | 50 |
| 12 | m-Difluorobenzene | Calcium phenate | 1:1 | O=C (−CN) | ...do... | 96 | 3-fluoro diphenyl ether bis(m-phenoxy)benzene | 89 |
| 13 | 4,4′-difluoro biphenyl | Potassium phenate | 1:3 | O=S | dimethyl sulfoxide | 3 | 4,4′-bis-phenoxybiphenyl | 75 |
| 14 | m-Difluorobenzene | ...do... | 1:1 | O=S=O | Tetrahydro 1,1-dioxythiophene | 8 | (A) 3-fluorodiphenyl ether / (B) m-bis(phenoxy)benzene | 66 |
| 15 | ...do... | ...do... | 1:1 | O←N | Pyridine-N-oxide | 21 | (A) 3-fluorodiphenyl ether / (B) m-bis(phenoxy)benzene | |
| 16 | 4,4′-difluoro biphenyl | ...do... | 1:2 | O=C-N | Diphenylacetamide | 12 | (A) 4-fluoro-4′-phenoxybiphenyl / (B) 4,4′-bis(phenoxy)biphenyl | |
| 17 | 3-fluorodiphenyl ether | ...do... | 1:1 | O=C | Benzophenone | 30 | m-bis(phenoxy)benzene | |
| 18 | ...do... | ...do... | 1:1 | O=C-N-H | Acetanilide | 33 | ...do... | |

The following table, Table II, illustrates the high degree of reactivity of the reactive fluoro atom and the selectivity which is obtained when other halogens other than fluoro are present on the same reactant or on different reactants in the same process system. The procedure of Examples 1 through 4 with respect to extraction of the final product and subsequent removal of solvents was followed in the following examples. In addition, the reaction products were identified by utilizing gas liquid chromatography followed by infrared analysis. The term reactive selectivity of F to Cl or Br as is utilized in Examples 21 through 25 was determined by dividing the weight percent yield of the non-fluoro-containing product by the corresponding weight percent yield of the fluoro-containing product. The term "Corresponding Products" which is applicable to Examples 21 through 25 means the two reactants which are obtained as follows: (1) the product which is obtained when the fluoro atom of reactant (A) reacts exclusively with reactant (B) and (2) the product which is obtained when the chloro or bromo atom of reactant (A) reacts exclusively with reactant (B). Thus, the corresponding product represented by (1) would be the all-chloro- or bromo-containing product which would be prepared from the reaction of (A) and (B), whereas the corresponding product represented by (2) would be the all-fluoro-containing product which would result from the interaction of (A) and (B). Thus, the only difference between the corresponding products, that is, (1) and (2) would be that in the case of (1), a chloro or bromo atom would be substituted on the corresponding product, whereas in (2), a fluoro atom would be substituted upon the corresponding product.

TABLE II

| Ex. No. | A R(Hal)n Reactant | A Halogen | B M_b[X(Z)_d]_c | Mole ratio, A:B | Dipolar aprotic solvent | Reaction time, hours | Average reaction, temp., °C. | Corresponding products or product | Yield, percent | Relative, selectivity of F to Cl or Br |
|---|---|---|---|---|---|---|---|---|---|---|
| 19 | 3-fluorochlorobenzene | F, Cl | Sodium phenate | 1:1 | N-methyl pyrrolidone | 31 | 170 | (A) m-chlorodiphenylether<br>(B) m-fluorodiphenyl ether | 87<br>0.3 | 290 |
| 20 | ...do... | F, Cl | Potassium-m-trifluoromethyl phenate | 1:1 | ...do... | 8 | 195 | (A) 3-chloro-3'-trifluoromethyldiphenyl ether<br>(B) 3-chloro-3'-trifluoromethyldiphenyl ether | 69<br><1.2 | >60 |
| 21 | ...do... | F, Cl | Potassium phenate | 1:1 | Pyrrolidone | 24 |  | (A)<br>(B) | <0.6 | >100 |
| 22 | 3-bromofluorobenzene | F, Br | Potassium phenate | 1:1 | N-methyl pyrrolidone | 23 | 170 | (A) 3-bromodiphenyl ether<br>(B) 3-fluorodiphenyl ether | 74<br>3 | 25 |
| 23 | Fluorodiphenyl ether | F | Potassium-m-chlorophenate | 1:1 | ...do... | 32 | 170 | (A) m-(m-phenoxy-phenoxy)chlorobenzene | 78 |  |
| 24 | m-Difluorobenzene | F | Potassium phenate | 1:2.5 | ...do... | 5 | 200 | (A) bis(m-phenoxy)-benzene | 80 |  |
| 25 | m-Dibromobenzene | Br |  | 1:2.5 | ...do... | 5 | 200 | ...do... | 5 |  |
| 26 | m-Dichlorobenzene | Cl |  | 1:2.5 | ...do... | 5 | 200 | ...do... | 7 |  |
| 27 | Bromobenzene | Br |  | 1:1 | ...do... | 7 | 190 | (A) diphenyl ether | 5 |  |

As is well illustrated by Table I and Table II, the process of this invention can be carried out to prepare a wide spectrum of compounds. In particular, Table II effectively demonstrates the unexpected reactivity of the fluoro atom over other halogens such as chloro and bromo. In particular, as is illustrated by the reactive selectivity of fluoro to chloro and bromo, the fluoro atom interacts preferentially over the other two halogens. Thus, selectivity numbers in the order of 25 to 290 demonstrate that halogen-containing compounds such as bromo- and chloro-containing compounds can be prepared by utilizing a reactive fluoro reactant represented by (A). Thus, this invention provides a process for preparing halogenated compounds in high yields in a one-step process.

In addition, Table II demonstrates the high degree of reactivity of the fluoro atom especially Examples 26 through 30 wherein the yields utilizing the reactive fluoro compound are in the order of 12 to 20 times greater than the corresponding chloro or bromo derivative. Thus, it is possible to utilize, for example, two starting reactants represented by (A), one of which contains, for example, one or more chloro or bromo atoms and a second reactant which does not contain a chloro or bromo atom to prepare a mixture of compounds wherein one of the compunds contains at least one bromo or chloro atom. Thus, as is readily apparent from Table II, Examples 21 and 27, a mixture of compounds comprising m-chlorodiphenyl ether and bis-m-phenoxybenzene can be prepared if starting reactants such as 3-fluoro-chlorobenzene and m-difluorobenzene are utilized in carrying out the process of this invention. The unexpectedly high degree of reactivity of a fluoro atom and therefore selectivity provides a process for preparing in one step an entire spectrum of compounds and mixtures of compounds which find utility in many areas. Thus, many compounds, including polyphenyl ethers, polyphenyl thioethers, mixed polyphenyl ethers-thioethers, phenoxybiphenyls, phenylmercaptobiphenyls and mixed phenoxylphenylmercaptobiphenyls and mixtures of the above compounds with halogenated derivatives thereof such as bromo- and chloro-substitued derivatives.

What is claimed is:

1. A process for producing ethers and thioethers which consists essentially of forming an admixture of
    (A) a fluoro-containing compound represented by the structure $$R(F)_n$$

wherein R is a member of the class consisting of aromatic hydrocarbon groups and substituted aromatic hydrocarbon groups containing up to 30 carbon atoms and wherein the substituents of the hydrocarbon groups are selected from the class consisting of aryloxy, alkoxy, polyaryloxy, haloaryl, arylmercapto, polyarylmercapto, haloarylmercapto, haloalkyl, haloaryloxy, $n$ is a whole number having a value of at least 1 to 6 with the proviso that no more than 3 fluorine atoms are on the same ring and
    (B) a metal compound represented by the structure $$M_b(X(Z)_d)_c$$

wherein M is selected from the group consisting of alkali metals and alkaline earth metals, X is selected from the group consisting of oxygen and sulfur, Z is an aryl group, $b$ is a number having a value of at least 1, $c$ is a number having a value of from 1 to the product of $b$ times the valence of M provided that when M is an alkali metal $c$ has a value of 1, $d$ is a whole number having a value of 0 to 1, provided that when X is sulfur $d$ has a value of 1 and when $d$ is 0, M is an alkali metal
    in the presence of
    (C) a dipolar aprotic solvent and maintaining said admixture at a temperature of from 50° C. to about 350° C., whereby said fluoro-containing compound and said metal compound react to produce said ether or thioether.

2. A process of claim 1 wherein M is an alkali metal, $c$ has a value of 1 and $d$ has a value of 1.

3. A process of claim 2 wherein R is a hydrocarbon-containing group having from 1 to 5 carbocyclic rings selected from the group consisting of phenyl and phenylene rings optionally linked by from 0 to 4 hetero atoms selected from the group consisting of oxygen and sulfur and $n$ is a whole number having a value of from 1 to about 6.

4. A process of claim 3 wherein Z is an aryl group selected from the group consisting of phenyl and substituted phenyl wherein said substituents are selected from the group consisting of halogen, phenylmercapto, phenoxy and a substitutent having from 2 to 5 carbocyclic rings selected from the group consisting of phenyl and phenylene rings optionally linked by from 0 to 4 hetero atoms selected from the group consisting of oxygen and sulfur.

5. A process of claim 4 wherein the dipolar aprotic solvent is selected from the group consisting of mono-, di- and triamides of an acid of phosphorus.

6. A process of claim 5 wherein the is N,N,N',N',N'',N''-hexaalkylphosphorotriamide wherein each alkyl group contains from 1 to 10 carbon atoms.

7. A process of claim 4 wherein the dipolar aprotic solvent is a dialkyl sulfoxide wherein each alkyl group contains from 1 to 8 carbon atoms.

8. A process of claim 4 wherein the dipolar aprotic solvent is a 1,1-dioxytetrahydrothiophene.

9. A process of claim 4 wherein the dipolar aprotic solvent is selected from the group consisting of an N,N-dialkyl alkylamide wherein each alkyl group contains from 1 to 12 carbon atoms and an N-alkyl carbon-containing heterocyclic compound having from 4 to 8 atoms in the ring.

10. A process of claim 9 wherein the heterocyclic compound is N-alkyl pyrrolidone wherein the alkyl group contains from 1 to 10 carbon atoms.

References Cited

UNITED STATES PATENTS

| | | | |
|---|---|---|---|
| 3,422,154 | 1/1969 | Laucius et al. | 260—612 |
| 3,423,470 | 1/1969 | Rohr et al. | 260—612 |
| 3,374,274 | 3/1968 | Spainhour | 260—609 |
| 3,032,594 | 5/1962 | Towle | 260—612 |
| 3,294,846 | 12/1966 | Livak et al. | 260—613 |
| 3,321,529 | 5/1967 | Campbell | 260—609 |
| 3,322,834 | 5/1967 | Hill et al. | 260—609 |

OTHER REFERENCES

Bronnert et al.: "Tetrahedron," vol. 10, (1960) pp. 160–163.

CHARLES B. PARKER, Primary Examiner

D. R. PHILLIPS, Assistant Examiner

U.S. Cl. X.R.

260—79.7, 250, 251, 283, 289, 293.4, 294.7, 294.8, 294.9, 297, 302, 304, 307, 308, 309, 309.2, 310, 326.5, 326.62, 330.5, 332.3, 346.2, 347.2, 347.8, 465, 516, 571, 612